United States Patent [19]
Rudolph

[11] Patent Number: 5,119,581
[45] Date of Patent: Jun. 9, 1992

[54] FISHING LURE HAVING OSCILLATING MOTION

[75] Inventor: John H. Rudolph, 1685 Arroyo Dr., Laguna Beach, Calif. 92651

[73] Assignee: John H. Rudolph, Laguna Beach, Calif.

[21] Appl. No.: 832,424

[22] Filed: Feb. 7, 1992

[51] Int. Cl.⁵ ............................................. A01K 85/00
[52] U.S. Cl. ...................... 43/42.22; 43/42.28; 43/42.37; 43/42.47; 43/42.39; 43/42.38
[58] Field of Search .............. 43/42.09, 42.22, 42.28, 43/42.45, 42.47, 42.37, 42.38, 42.39

[56] References Cited

U.S. PATENT DOCUMENTS

| | | | |
|---|---|---|---|
| 2,179,641 | 11/1939 | Layfield | 43/42.47 |
| 2,243,663 | 5/1941 | Wareham | 43/42.47 |
| 3,299,561 | 1/1967 | Desboy | 43/42.38 |
| 3,727,339 | 4/1973 | Le Master | 43/42.22 |
| 3,738,046 | 6/1973 | Johnson | 43/42.39 |
| 4,155,191 | 5/1979 | Spivey | 43/42.22 |
| 4,437,257 | 3/1984 | Luge | 43/42.45 |
| 4,611,422 | 9/1986 | Hampton | 43/42.38 |
| 4,689,914 | 9/1987 | Quinlan | 43/42.22 |
| 4,700,504 | 10/1987 | Mattison | 43/42.33 |
| 4,815,229 | 3/1989 | Nicholson, III | 43/42.47 |
| 4,831,764 | 5/1989 | Jecevicus | 43/42.25 |
| 4,837,967 | 6/1989 | Dunbar | 43/42.09 |
| 4,918,854 | 4/1990 | Webre, Jr. | 43/42.31 |
| 4,928,422 | 5/1990 | Pitre | 43/42 |

Primary Examiner—Kurt Rowan
Attorney, Agent, or Firm—Marco Search, Gene Scott

[57] ABSTRACT

A fishing lure is provided for executing oscillating motion when being pulled through the water. A rigid wire is bent at one end into a fishing hook or alternately into a ring for holding a fishing hook, and at the other end into ring. The lure has one or alternately two protruding blades for controlling oscillating motion of the lure and a V-notch for holding a trailing bait securely. A buoyant plug or a weight may be used to change the degree of buoyancy of the lure. The position of the forward ring helps to stabilize the lure. Specific guidelines for the shape of the blades are given.

14 Claims, 1 Drawing Sheet

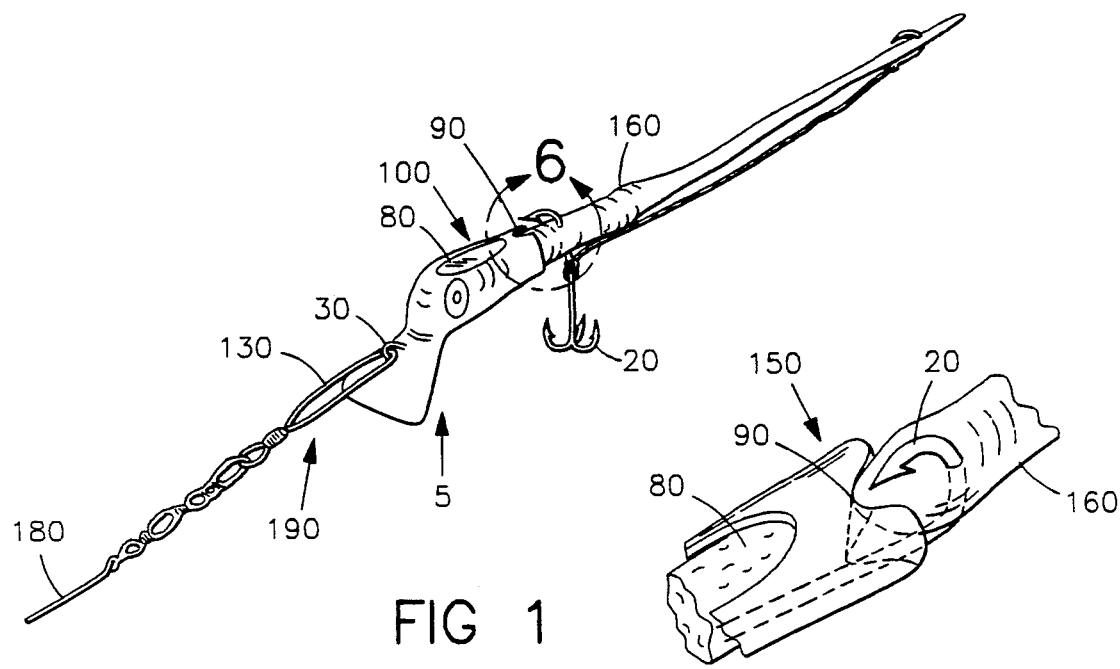
FIG 1
FIG 6
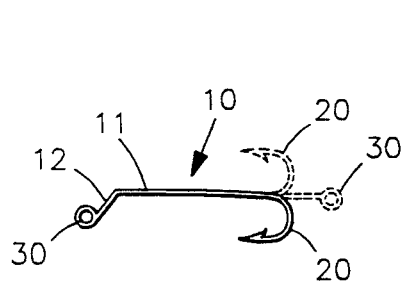
FIG 2
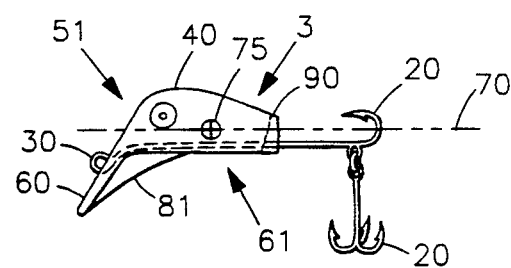
FIG 3
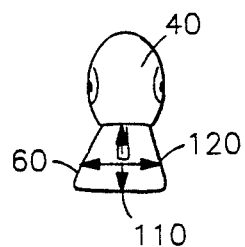
FIG 4
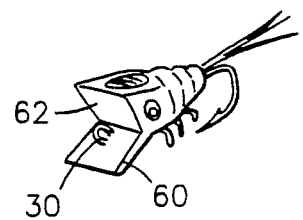
FIG 5

FISHING LURE HAVING OSCILLATING MOTION

FIELD OF THE INVENTION

This invention relates generally to fishing lures, and, more particularly, to a fishing lure that oscillates as it is pulled through water.

BACKGROUND OF THE INVENTION

The purpose behind most fishing lures is to convincingly simulate natural prey, such as insects, worms, or smaller fish, upon which particular types of fish game feed. Such prey often exhibit specific oscillatory motions, such as horizontal or vertical oscillations as they move through the water. Clearly, any fishing lure that closely mimics the behaviour of such prey will be an effective lure for these game fish.

Several fishing lures found in the prior art address such oscillatory behavior. For example, U.S. Pat. No. 4,700,504 granted to Mattison on Oct. 20, 1987, teaches a fishing lure with a diving plane fixedly attached to and extending forward from a lure body. A stabilizing fin is included to prevent the lure from spinning. Unfortunately, the stabilizing fin also limits the degree to which the lure oscillates from side-to-side. While this type of device does exhibit a small degree of side-to-side motion when pulled through water, many insects and smaller fish exhibit a more aggressive motion, and consequently this type of lure is not entirely effective.

Another lure, disclosed in U.S. Pat. No. 3,727,339 to Le Master on Apr. 17, 1973, teaches a small fish-like lure with a V-shaped frontal vane, one side of which is larger than the other. A fishing line is attached at an eye located at the intersection of each side of the vane. Again, this type of device exhibits a degree of wobbling motion when motivated from the eye through water. However, the degree of oscillation is limited by the placement of the eye on the vane structure, and as a result this lure does not have aggressive activity and tends to rotate. Other U.S. Patents, such as U.S. Pat. No. 4,815,229 to Nicholson, III, on Mar. 28, 1989, and U.S. Pat. No. 4,155,191 to Spivey on May 22, 1979, are similarly limited in effectiveness due to the positioning of the eye on or near planar deflector members. Moreover, typical prior art devices of this type usually are not suited for both deep water and surface fishing, nor are they relatively simple to manufacture. Further, such devices, especially wooden lures, are often not strong enough to withstand the forces of a biting and fighting fish since the lure body is used to link the catching hook and the fishing line. This is a general mistake since the body usually does not have the strength needed for the forces involved.

Clearly, then, there is a need for a lure that more accurately simulates the back-and-forth or up-and-down oscillations of flies, bugs, worms, frogs, leeches, minnows, crickets, and the like. Such a needed device would be relatively simple to manufacture, would have at least one deflector blade for imparting said oscillations, and would have a high strength linkage between the fishing line and the hook for improved strength. The attachment position of the fishing line to the deflector would be optimized, and there would be no need for a stabilizing fin or the like that restricts lateral movement in such a lure. The present invention fulfills these needs and provides further related advantages.

SUMMARY OF THE INVENTION

The present invention is a fishing lure for being drawn through water for attracting a fish or the like. A rigid wire passes through the lure from the leading end to the trailing end is bent at the leading end into a ring and at the trailing end into either a hook or a second ring for attachment of a hook. The majority of the wire consists of a horizontally disposed straight portion around which the lure is constructed. The leading end of the wire has a short leg positioned at an angle and ending in the ring. This short leg allows the ring to lie below the center of gravity of the lure. The lure construction helps to prevent the lure from executing a spinning motion instead of an oscillating motion. To accomplish this, the leading ring and the trailing hook which holds the bait, are both formed to lie in a common vertical plane. Also, the lure has a double looped connector at the leading end, one loop connected to the leading ring, the other loop connected to the fishing line. This connector prevents fishing line biases from being transferred to the lure so that the lure has greater freedom of motion. The lure may contain a buoyancy plug or a weight for controlling the buoyancy of the lure, its depth in the water and for prevention of spinning. The rearward portion of the lure body contains a V-notch for restraining motion of the leading portion of the bait so that the bait does not unbalance the lure which leads to spinning. An important feature of the lure is a leading blade formed with the body and protruding forwardly and downwardly. Alternately, a second blade may be formed in an upward direction so that the pair of blades appear like an open mouth at the leading end of the lure. The single blade version produces a side to side wiggling motion and the double blade version produces an up and down undulation type motion.

The present invention, when pulled through water, simulates to a high degree the movements of natural terrestrial and water borne species, and exhibits an exciting, fish-attracting, snake-like, side-to-side or hopping up-and-down action. It has been found that the side-to-side action of the preferred embodiment simulates the motion of worms, snakes, flies, nymphs, beetles, leeches, and other crawling or slithering creatures. The up-and-down action of the alternate configuration, double deflecting blade embodiment simulates the actions of grasshoppers, crickets, frogs, and other jumping critters. The present invention may be used with a minimum of additional weight, whereby the lure tends to float on or close to the surface of the water and thereby attracts fish that feed relatively close to the surface. Alternatively, by adding weight to the line or the lure itself, the lure will sink and become attractive to fish that frequent greater depths. The present invention, therefore, is readily adaptable to a variety of different fishing techniques and conditions. Moreover, it is relatively simple to manufacture; the body being injection-molded around the rigid wire in one step.

Further, in embodiments wherein the wire is bent into two closed eyes, a variety of other fishing lures, hooks, and embellishments may be readily attached. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective illustration of the invention illustrating a fishing line, the lure, and a bait held to and trailing the lure;

FIG. 2 is a left side elevational view of the rigid wire of the invention, bent at each end into elements appropriate to proper functioning of the lure;

FIG. 3 is a left side elevational view of one embodiment of the invention, illustrating a lure body having a leading blade, and a bait retaining hook, and a catching hook;

FIG. 4 is a front elevational view of the embodiment of FIG. 3, showing in greater detail the blade of the invention; and FIG. 5 is a perspective illustration of an alternative embodiment of the invention, illustrating a pair of blades, one projecting upwardly, the other projecting downwardly, FIG. 6 is a perspective illustration of the invention showing the V-notch and buoyant plug.

DETAILED DESCRIPTION OF THE PREFERRED EMBODIMENTS

FIG. 1 shows a fishing lure 5 for moving with oscillating motion through water while trailing a bait 6. FIG. 2 depicts a rigid wire 10 having a first straight portion 11 and a second, shorter straight portion 12, joined at an obtuse angle, with the short leg end formed into a closed ring 30, and the other end formed into either a fishing hook 20, which may be positioned upwardly or downwardly, or alternately into a second closed ring 30 for attachment of an alternate hook 21 (FIG. 1). The lure body 40 has a shape approximating the foreportion of a marine creature such as a fish or other animal, having a leading 51 and a trailing 61 ends. A horizontal longitudinal axis 70 passes through the center of gravity 75 of the fishing lure from leading 51 to trailing 61 ends. In one embodiment of the invention, the leading end 51 has a downwardly protruding blade 60 which preferably makes an angle of 55 degrees with the horizontal. The trailing end has a vertical V-notch 90 into which the leading end of the bait 6 protrudes so that the motion of the lure cannot displace the leading end of the bait to one side of the lure or to the other side of the lure which would unbalance the lure causing it to rotate instead of oscillate. The wire 10 passes through the body 40 such that the first portion 11 of the wire lies approximately parallel to, in the same vertical plane as, and below, the horizontal longitudinal axis 70, the second portion 12 of the wire lying approximately parallel to the blade 60, with the ring 30 protruding forward of the blade 60, the hook 20 or alternately the second ring 30 protruding from the center and rearwardly of the V-notch 90. The forward ring 30 is attached to a fishing line 95 for drawing the lure through the water, the water acting on the blade to force the lure to lurch first to one side and then to the other side.

The body 40 of the lure may have a cavity 100 with a set of buoyant plugs of various weight densities, each of the buoyant plugs 80 may be snapped into the cavity 100 in order to select a particular running depth for the lure. A set of weights are provided for selecting further a specific weight 81 attached to the lure below the center of gravity 75 of the lure 5 to prevent rotation of the lure and to position the lure at a selected greater depth in the water.

The blade is preferably shaped as an isosceles trapezoid as shown in FIG. 4, with an altitude 110 and the median 120 in the ratio of between approximately 2:1 to 1:2. This shape provides the lure with a snappy side to side motion and inhibits lure rotation. The ring and the hook are preferably oriented in a common vertical plane such that forces for causing the lure to execute a positional bias are minimized. A fishing line connector 190 is made from a flexible material and is formed into a double loop. One loop of the connector 190 is attached to the ring 30 at the leading end 51 of the lure 5, the other loop of the connector 190 is attached to the fishing line 95. This connector 190 provides isolation of the lure from positional bias transmitted by the fishing line 95, whereby the lure has improved freedom of motion. In this configuration the lure executes maximum horizontal oscillatory motion through the water for greatly improved attractiveness to predators.

In a second embodiment of the invention the lure has an upwardly protruding blade 62 in addition to the downwardly protruding blade 60. In this configuration the downwardly protruding blade has a height to width ratio of approximately 1.5 to 2, and the upwardly protruding blade has a height to width ratio of approximately 1 to 2. The two blades 60, 62 are joined at the leading end 51 of the lure at a common point, the ring 30 being positioned below this common point by a distance approximately equal to 25% of the height of the downwardly protruding blade 60. In this configuration the lure oscillates in the vertical direction upward and then downward in oscillatory motion and will not rotate.

I claim:

1. A fishing lure for moving with oscillating motion through water while trailing a bait, comprising:

a rigid wire having a first straight portion and a second, shorter straight portion, the two portions joined at an obtuse angle, the end of the second portion formed into a closed ring, the end of the first portion formed into a fishing element;

a lure body having a shape approximating the foreportion of a marine creature, the body having a leading end and a trailing end, a horizontal longitudinal axis passing through the center of gravity of the fishing lure from leading to trailing ends, the leading end having a downwardly protruding blade, the trailing end having a vertical V-notch therein;

the wire passing through the body such that the first portion of the wire lies approximately parallel to, in the same vertical plane as, and below, the horizontal longitudinal axis, the second portion of the wire lying approximately parallel to the blade, the ring protruding forward of the blade, the fishing element protruding from the center of the V-notch;

whereby a fishing line attached to the ring for pulling the lure through the water causes the lure and bait to oscillate from side to side, the leading portion of the bait being restrained from moving to either side of the lure by the V-notch.

2. The lure of claim 1 further including a set of buoyant plugs, each of the plugs having a different weight density, and wherein the body has a cavity for accepting one of the plugs therein, the plug increasing the buoyancy of the lure.

3. The lure of claim 1 further including a set of weights, each of the weights having a different weight density, so that with one of the weights attached to the lure below the center of mass of the lure, the lure is prevented from rotating and is positioned at a greater depth in the water.

4. The lure of claim 1 wherein the blade forms an angle of approximately 55 degrees with the horizontal.

5. The lure of claim 1 wherein the blade is shaped as an isosceles trapezoid.

6. The lure of claim 5 wherein the altitude and the median of the trapezoid are in the ratio of between approximately 2:1 to 1:2.

7. The lure of claim 1 wherein the fishing element is a ring for holding a fishing hook.

8. The lure of claim 1 wherein the fishing element is a fishing hook.

9. The lure of claim 8 wherein the ring and the hook are both oriented in a common vertical plane.

10. The lure of claim 1 further including a fishing line connector formed from a flexible material into a double loop, one loop of the connector for attachment to the ring, the other loop of the connector for attachment to a fishing line thereto, the connector providing isolation of the lure from positional bias transmitted by the fishing line, whereby the lure has improved freedom of motion.

11. A fishing lure for moving with oscillating motion through water while trailing a bait, comprising:

a rigid wire having a first straight portion and a second, shorter straight portion, the two portions joined at an obtuse angle, the end of the second portion formed into a closed ring, the end of the first portion formed into a fishing element;

a lure body having a shape approximating the foreportion of a marine creature, the body having a leading and a trailing ends, a horizontal longitudinal axis passing through the center of gravity of the fishing lure from leading to trailing ends, the leading end having a downwardly protruding blade and an upwardly protruding blade, the trailing end having a vertical V-notch therein;

the wire passing through the body such that the first portion of the wire lies approximately parallel to, in the same vertical plane as, and below, the horizontal longitudinal axis, the second portion of the wire lying approximately parallel to the blade, the ring protruding forward of the downwardly protruding blade, the fishing element protruding from the center of the V-notch;

whereby a fishing line attached to the ring for pulling the lure through the water causes the lure and bait to oscillate in an upward and downward undulation, the leading portion of the bait being restrained from lateral movement by the V-notch.

12. The lure of claim 11 wherein the downwardly protruding blade has a height to width ratio of approximately 1.5 to 2, and the upwardly protruding blade has a height to width ratio of approximately 1 to 2.

13. The lure of claim 11 wherein the upwardly protruding blade shares a common point of joining with the downwardly protruding blade, the ring being positioned a distance below said point of joining.

14. The lure of claim 13 wherein said distance is approximately equal to 25% of the height of the downwardly protruding blade.

* * * * *